(12) United States Patent
Baumbick et al.

(10) Patent No.: US 12,351,049 B2
(45) Date of Patent: Jul. 8, 2025

(54) CHARGING CORD DESIGNS AND ROUTING CONFIGURATIONS FOR USE DURING IN-FLIGHT BIDIRECTIONAL CHARGING OF ELECTRIFIED VEHICLES

(71) Applicant: FORD GLOBAL TECHNOLOGIES, LLC, Dearborn, MI (US)

(72) Inventors: James Baumbick, Northville, MI (US); Paul Kenneth Dellock, Northville, MI (US); David Brian Glickman, Southfield, MI (US); Katherine Howard-Cone, Canton, MI (US); Annette Lynn Huebner, Highland, MI (US); Ryan O'Gorman, Beverly Hills, MI (US); Stuart C. Salter, White Lake, MI (US); Peter Phung, Windsor (CA)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 895 days.

(21) Appl. No.: 17/394,480

(22) Filed: Aug. 5, 2021

(65) Prior Publication Data
US 2023/0042880 A1 Feb. 9, 2023

(51) Int. Cl.
*B60L 53/18* (2019.01)
*B60L 53/16* (2019.01)
*H01R 13/627* (2006.01)

(52) U.S. Cl.
CPC ........... *B60L 53/18* (2019.02); *B60L 53/16* (2019.02); *H01R 13/627* (2013.01)

(58) Field of Classification Search
CPC ........ B60L 53/18; B60L 53/16; H01R 13/627

USPC ......................................................... 320/104
See application file for complete search history.

(56) References Cited

U.S. PATENT DOCUMENTS

| | | | |
|---|---|---|---|
| 6,162,994 A * | 12/2000 | Durand | B32B 5/245 174/120 R |
| 7,518,058 B1 * | 4/2009 | Hagbrandt | H02G 3/32 174/113 C |
| 10,044,137 B2 | 8/2018 | Petrie et al. | |
| 2012/0129369 A1 * | 5/2012 | Bogart | B60L 58/10 439/153 |
| 2013/0175083 A1 * | 7/2013 | Bonwit | B60L 53/305 174/541 |
| 2013/0233964 A1 * | 9/2013 | Woodworth | B64U 10/60 244/175 |
| 2016/0372948 A1 * | 12/2016 | Kvols | H02J 50/402 |

(Continued)

FOREIGN PATENT DOCUMENTS

| | | | |
|---|---|---|---|
| CN | 101714424 A | * | 5/2010 |
| CN | 203300270 U | * | 11/2013 |

(Continued)

*Primary Examiner* — Suresh Memula
(74) *Attorney, Agent, or Firm* — David B. Kelley; Carlson, Gaskey & Olds, P.C.

(57) ABSTRACT

Charging cord assemblies for transferring power between electrified vehicles during in-flight bidirectional energy transfer events may include a cable including a wire bundle coated with a conductive foamed plastic shielding to establish a cable subassembly. The conductive foamed plastic shielding is configured to reduce electromagnetic interference (EMI) of the cable. Various cable routing arrangements may be utilized for routing the cable of the charging cord assembly during the in-flight bidirectional energy transfer events.

19 Claims, 7 Drawing Sheets

(56) References Cited

U.S. PATENT DOCUMENTS

| | | | | |
|---|---|---|---|---|
| 2018/0186315 | A1* | 7/2018 | Terzis | B60L 53/31 |
| 2021/0238007 | A1* | 8/2021 | Wilson | B65H 75/4484 |
| 2022/0332201 | A1* | 10/2022 | Khamashta | B60L 53/18 |
| 2023/0312138 | A1* | 10/2023 | Wiegman | B60L 53/68 |
| | | | | 320/109 |

FOREIGN PATENT DOCUMENTS

| | | | | |
|---|---|---|---|---|
| CN | 205354746 U | | 6/2016 | |
| CN | 106448935 A | * | 2/2017 | H01B 13/012 |
| CN | 110164596 A | * | 8/2019 | |
| CN | 212032747 U | * | 11/2020 | |
| CN | 112708166 A | * | 4/2021 | |
| CN | 216562543 U | * | 5/2022 | |
| CN | 217008687 U | * | 7/2022 | |
| CN | 217239120 U | * | 8/2022 | |
| CN | 218414017 U | * | 1/2023 | |
| CN | 116285320 A | * | 6/2023 | |
| CN | 219610044 U | * | 8/2023 | |
| CN | 116779239 A | * | 9/2023 | |
| CN | 117038191 A | * | 11/2023 | |
| DE | 102018201441 A1 | | 8/2019 | |
| EP | 4056630 A1 | * | 9/2022 | C08J 9/0023 |
| FR | 2664850 A1 | * | 1/1992 | |
| JP | 2023115911 A | * | 8/2023 | H01B 13/22 |
| WO | WO-2012078921 A2 | * | 6/2012 | B60L 11/1818 |
| WO | WO-2019002868 A1 | * | 1/2019 | B60L 50/60 |
| WO | 2019226630 A1 | | 11/2019 | |
| WO | 2021045560 A1 | | 3/2021 | |
| WO | WO-2024146646 A1 | * | 7/2024 | |

* cited by examiner

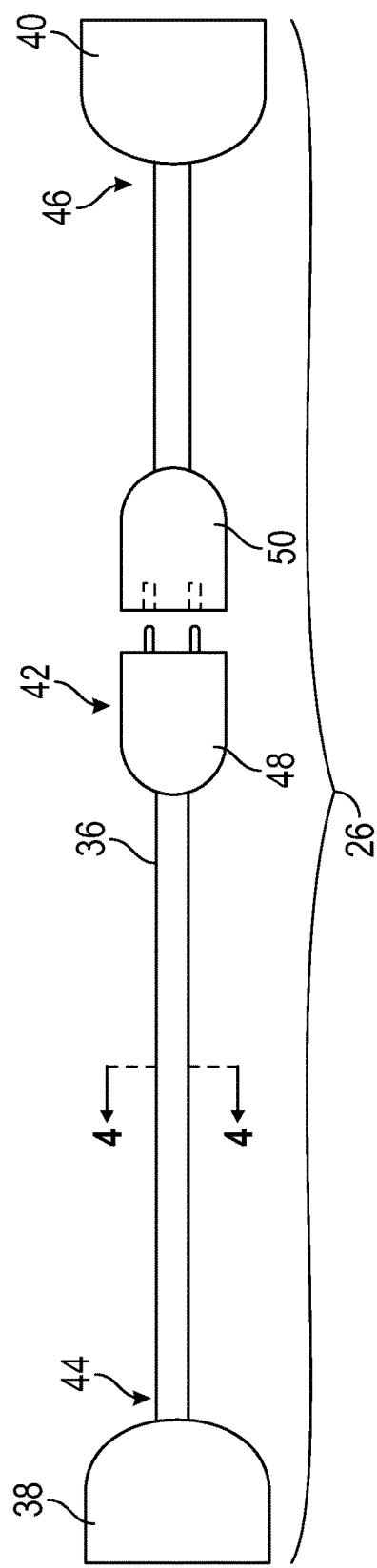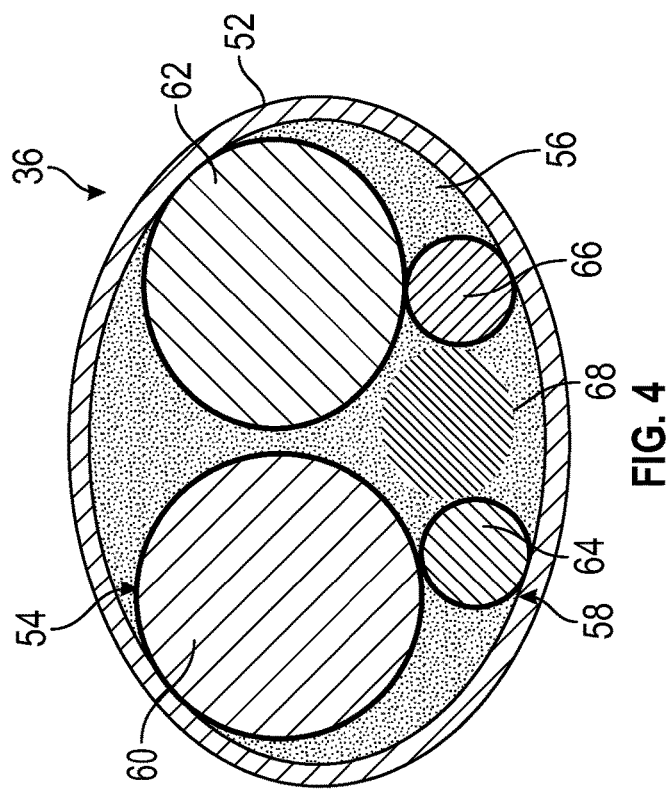

CHARGING CORD DESIGNS AND ROUTING CONFIGURATIONS FOR USE DURING IN-FLIGHT BIDIRECTIONAL CHARGING OF ELECTRIFIED VEHICLES

TECHNICAL FIELD

This disclosure relates generally to charging cord assemblies for transferring power between electrified vehicles during in-flight bidirectional charging events.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack and are typically charged while parked at a charging station or some other utility power source. A charging cord is commonly used to connect the plug-in electrified vehicle to the charging station for transferring power to the vehicle.

SUMMARY

A charging cord assembly according to an exemplary aspect of the present disclosure includes, among other things, a cable including a wire bundle coated with a conductive foamed plastic shielding.

In a further non-limiting embodiment of the foregoing charging cord assembly, a first charge coupler is connected to a first end portion of the cable, and a second charge coupler is connected to a second end portion of the cable.

In a further non-limiting embodiment of either of the foregoing charging cord assemblies, a breakaway plug assembly is disposed within the cable at a location between the first charge coupler and the second charge coupler.

In a further non-limiting embodiment of any of the foregoing charging cord assemblies, the wire bundle and the conductive foamed plastic shielding establish a cable subassembly of the cable. The cable subassembly is coated with an outer jacket.

In a further non-limiting embodiment of any of the foregoing charging cord assemblies, the wire bundle includes a bare ground wire that is in direct contact with the conductive foamed plastic shielding.

In a further non-limiting embodiment of any of the foregoing charging cord assemblies, the wire bundle includes at least a first power wire, a second power wire, a first communications wire, a second communications wire, and a ground wire.

In a further non-limiting embodiment of any of the foregoing charging cord assemblies, a material make-up of the conductive foamed plastic shielding includes a cross-linkable plastic material, a conductive filler, and a foaming agent.

In a further non-limiting embodiment of any of the foregoing charging cord assemblies, the cross-linkable plastic material is a cross-linkable polyethylene, the conductive filler includes a graphene or an exfoliated graphite, and the foaming agent is a chemical foaming agent.

In a further non-limiting embodiment of any of the foregoing charging cord assemblies, the conductive filler includes a carbon nanostructure.

In a further non-limiting embodiment of any of the foregoing charging cord assemblies, the conductive foamed plastic shielding includes a cross-linkable plastic material, a foaming agent, a conductive filler, a compatibilizer, and an antioxidant.

In a further non-limiting embodiment of any of the foregoing charging cord assemblies, the cross-linkable plastic material is a cross-linkable polyethylene, the foaming agent is Foamazol™ 89, the conductive filler includes GrapheneBlack™ and Athlos™ CNS, the compatibilizer is Admer™ QF551E, and the antioxidant is Ultranox® 815.

A vehicle-to-vehicle in-flight energy transfer system according to another exemplary aspect of the present disclosure includes, among other things, a towing vehicle, a towed vehicle, and a charging cord assembly operably connectable to each of the towing vehicle and the towed vehicle for transferring charge energy therebetween. The charging cord assembly includes a cable that includes a conductive foamed plastic shielding.

In a further non-limiting embodiment of the foregoing system, the towed vehicle is coupled to the towing vehicle by a towing device during a towing event in which the charge energy is transferred between the towing vehicle and the towed vehicle.

In a further non-limiting embodiment of either of the foregoing systems, the towing event is an in-flight bidirectional charging towing event.

In a further non-limiting embodiment of any of the foregoing systems, the conductive foamed plastic shielding surrounds a wire bundle of the cable, and an outer jacket surrounds the conductive foamed plastic shielding.

In a further non-limiting embodiment of any of the foregoing systems, a material make-up of the conductive foamed plastic shielding includes a cross-linkable plastic material, a conductive filler, and a foaming agent.

In a further non-limiting embodiment of any of the foregoing systems, the cross-linkable plastic material is a cross-linkable polyethylene, the conductive filler includes a graphene or an exfoliated graphite, and the foaming agent is a chemical foaming agent.

In a further non-limiting embodiment of any of the foregoing systems, an adjustable retaining ring is configured for routing the cable within a cargo space of the towing vehicle.

In a further non-limiting embodiment of any of the foregoing systems, an attachment strap assembly is configured for routing the cable along a running board or a top surface of the towing vehicle.

In a further non-limiting embodiment of any of the foregoing systems, the attachment strap assembly includes a two-piece fastener assembly or an attachment ratchet.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 illustrates an exemplary charging cord assembly for use during in-flight bidirectional energy transfer events.

FIG. 4 is a cross-sectional view of a cable of the charging cord assembly of FIG. 3.

DETAILED DESCRIPTION

This disclosure is directed to charging cord assemblies for transferring power between electrified vehicles during in-flight bidirectional energy transfer events. Exemplary charging cord assemblies may include a cable including a wire bundle coated with a conductive foamed plastic shielding to establish a cable subassembly. The conductive foamed plastic shielding is configured to reduce electromagnetic interference (EMI) of the cable. Various arrangements for routing the cable of the charging cord assembly during the in-flight bidirectional energy transfer events are disclosed. These and other features of this disclosure are discussed in greater detail in the following paragraphs of this detailed description.

Figure 1:
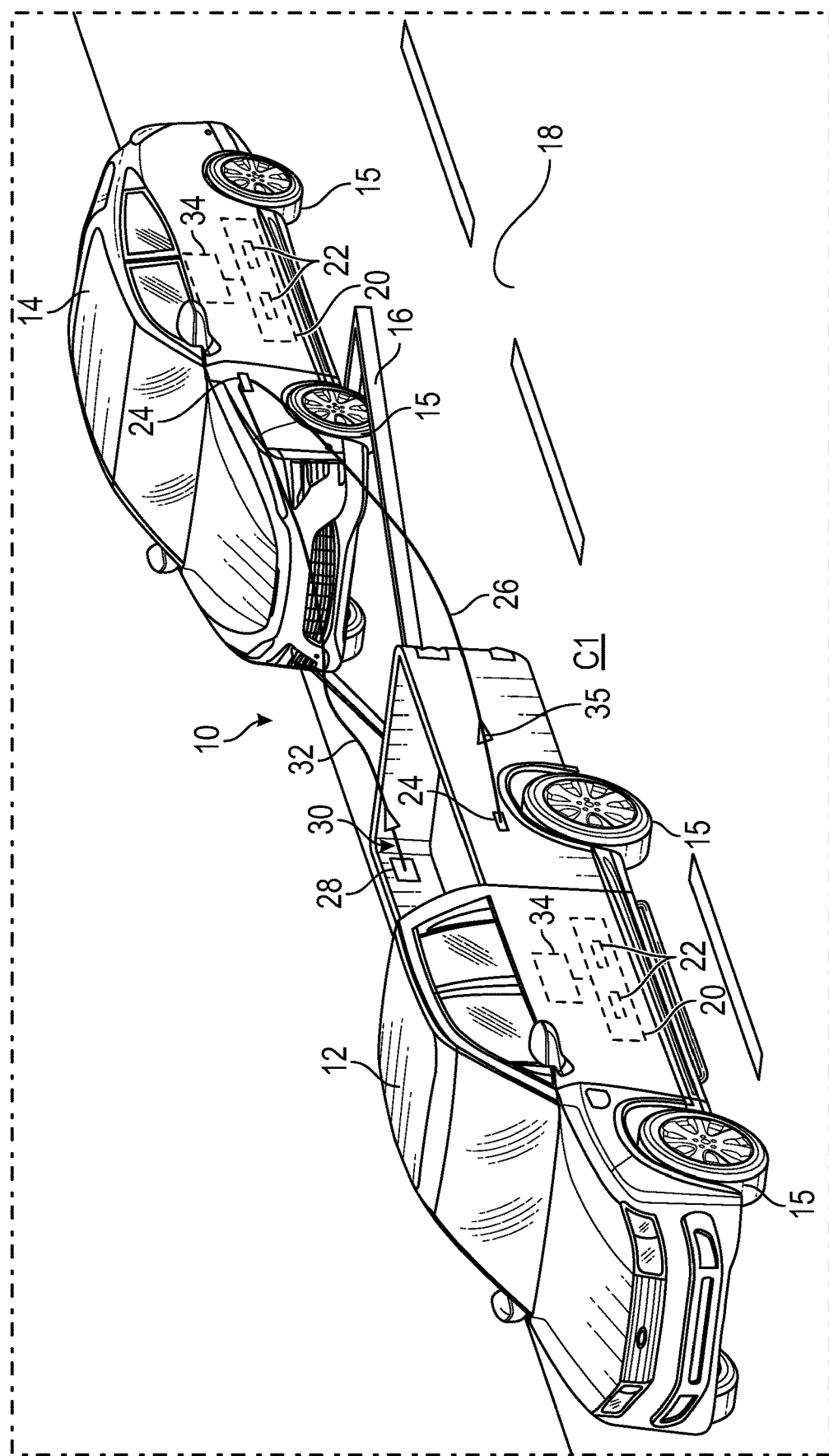
FIG. 1 schematically illustrates a first in-flight configuration of a vehicle-to-vehicle energy transfer system.
Figure 2:
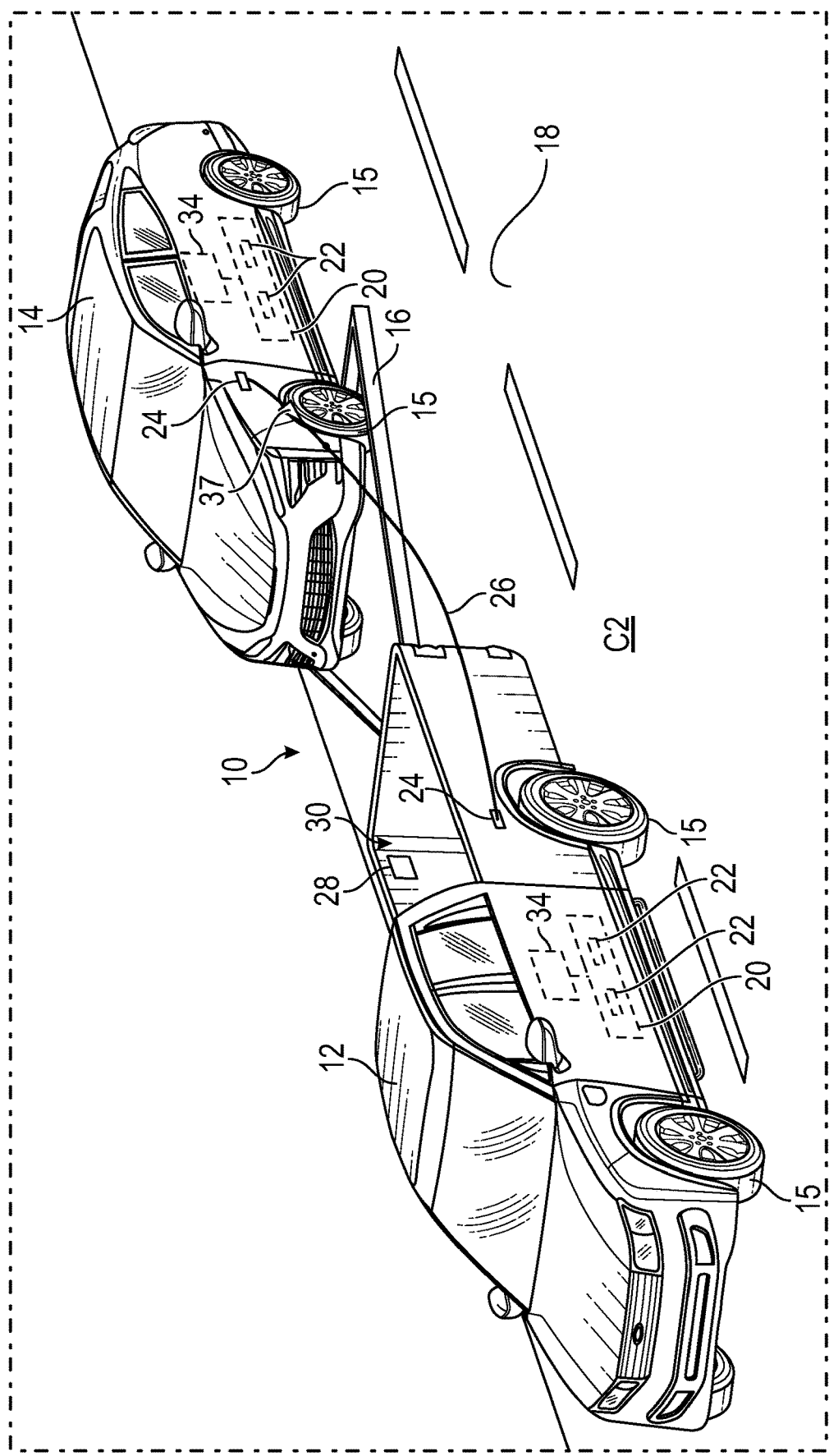
FIG. 2 schematically illustrates a second in-flight configuration of the vehicle-to-vehicle energy transfer system of FIG. 1.

FIGS. 1 and 2 schematically illustrate an exemplary vehicle-to-vehicle (V2V) in-flight energy transfer system 10 (hereinafter "the system 10") for bidirectionally transferring energy between a towing or leading vehicle 12 and a towed or trailing vehicle 14 during a towing event. In this disclosure, the term "in-flight" means during the coupled movement of the leading vehicle 12 and the trailing vehicle 14. Accordingly, the system 10 enables the bidirectional transfer of energy from the leading vehicle 12 to the trailing vehicle 14 or vice-versa while the leading and trailing vehicles 12, 14 are coupled together and making forward progress toward their desired destinations.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

The in-flight energy transfer afforded by the system 10 may be beneficial to both participating parties. For example, the user/owner of the trailing vehicle 14 may take advantage of the time while being towed by resting, sleeping, eating, working, etc., and the user/owner of the leading vehicle 12 may generate income for performing the towing/charging task (e.g., revenue opportunity).

A towing device 16 may releasably couple the trailing vehicle 14 relative to the leading vehicle 12 to allow the leading vehicle 12 to pull the trailing vehicle 14 along a roadway 18 and thus control driving of the trailing vehicle 14 during a towing event. The towing device 16 could by any type of towing device. Accordingly, the specific configuration of the towing device 16 is not intended to limit this disclosure.

In an embodiment, the leading vehicle 12 and the trailing vehicle 14 are both plug-in type electrified vehicles (e.g., a plug-in hybrid electric vehicle (PHEV) or a battery electric vehicle (BEV)). Each of the leading and trailing vehicles 12, 14 includes a traction battery pack 20. The leading vehicle 12 and the trailing vehicle 14 may each include an electrified powertrain capable of applying a propulsive torque from an electric machine (e.g., an electric motor) for driving drive wheels 15 of the leading and trailing vehicles 12, 14. Therefore, the powertrain of each of the leading vehicle 12 and the trailing vehicle 14 may electrically propel the respective set of drive wheels 15 either with or without the assistance of an internal combustion engine.

Although shown schematically, each traction battery pack 20 may be configured as a high voltage traction battery pack that includes a plurality of battery arrays 22 (i.e., battery assemblies or groupings of battery cells) capable of outputting electrical power to one or more electric machines of each vehicle. Other types of energy storage devices and/or output devices may also be used to electrically power each of the leading vehicle 12 and the trailing vehicle 14.

From time to time, charging the energy storage devices of the traction battery pack 20 of each of the leading vehicle 12 and the trailing vehicle 14 may be required or desirable. Each of the leading and trailing vehicles 12, 14 may therefore be equipped with a charging system that includes a charge port assembly 24. A charging cord assembly 26 (e.g., EVSE) may be connected to the corresponding charge port assemblies 24 of the leading and trailing vehicles 12, 14 in order to transfer charge energy from the traction battery pack 20 of the leading vehicle 12 or the trailing vehicle 14 to the traction battery pack 20 of the other of the leading vehicle 12 or the trailing vehicle 14. The charging cord assembly 26 may be configured to provide any level of charging (e.g., Level 1 AC charging, Level 2 AC charging, DC charging, etc.).

The charging system of the leading vehicle 12 could optionally be equipped with a secondary charge port assembly 28. In an embodiment, the secondary charge port assembly 28 is mounted within a cargo space 30 of the leading vehicle 12 for providing access to a power source at an external location of the leading vehicle 12. A charging cord assembly 32 may be connected to the secondary charge port assembly 28 and the charge port assembly 24 of the trailing vehicle 14 in order to transfer charge energy from the traction battery pack 20 of one of the leading vehicle 12 or the trailing vehicle 14 to the traction battery pack 20 of the other of the leading vehicle 12 or the trailing vehicle 14. The charging cord assembly 32 may be configured to provide Level 1 or Level 2 AC charging, for example. In another embodiment, energy can be transferred between the leading and trailing vehicles 12, 14 using both the charging cord assembly 26 and the charging cord assembly 32. Although not specifically shown, the leading vehicle 12 and/or the trailing vehicle 14 could be equipped with one or more additional charging interfaces.

The respective charging systems of the leading and trailing vehicles 12, 14 may additionally include a bidirectional power transfer system 34 configured for enabling the bidirectional transfer of power between the vehicles 12, 14. The bidirectional power transfer system 34 may be operably connected between the charge port assembly 24 and the traction battery pack 20 of each of the leading vehicle 12 and the trailing vehicle 14. The bidirectional power transfer system 34 may include various equipment, such as a charger, a converter, a motor controller (which may be referred to as an inverter system controller or ISC), etc., arranged and configured to establish the bidirectional transfer of electrical energy between the respective traction battery packs 20 of the leading and trailing vehicles 12, 14. The bidirectional power transfer systems 34 may additionally be configured to transfer energy between the traction battery packs 20 and the electric machines of each respective vehicle.

One non-limiting example of a suitable bidirectional power transfer system that may be employed for use within the leading vehicle 12 and/or the trailing vehicle 14 for achieving bidirectional power transfer is disclosed within US Patent Publication No. 2020/0324665, assigned to Ford Global Technologies, LLC, the disclosure of which is incorporated by reference herein. However, other bidirectional power transfer systems could also be utilized for achieving the bidirectional transfer of power between the leading and trailing vehicles 12, 14 within the scope of this disclosure.

FIG. 1 schematically illustrates a first in-flight configuration C1 of the system 10. During the first in-flight configuration C1, power may be transferred from the traction battery pack 20 of the leading vehicle 12 to the traction battery pack 20 of the trailing vehicle 14 (as schematically depicted by arrow 35).

FIG. 2 schematically illustrates a second in-flight configuration C2 of the system 10. During the second in-flight configuration C2, power may be transferred from the traction battery pack 20 of the trailing vehicle 14 to the traction battery pack 20 of the leading vehicle 12 (as schematically illustrated by arrow 37). In this way, the trailing vehicle 14 may charge the leading vehicle 12 during the in-flight towing and charging event, such as for increasing the towing distance that the leading vehicle 12 is capable of towing the trailing vehicle 14, for example.

The teachings of this disclosure may be applicable for any type of vehicle as the leading vehicle 12 and for any type of vehicle as the trailing vehicle 14. For example, the leading vehicle 12 or the trailing vehicle 14 could be configured as a car, a truck, a van, a sport utility vehicle (SUV), etc.

The leading vehicle 12 of FIGS. 1-2 is schematically illustrated as a pickup truck, and the trailing vehicle 14 of FIGS. 1-2 is schematically illustrated as a car. Thus, the trailing vehicle 14 is the smaller of the two vehicles in the embodiment of FIGS. 1-2. However, the leading vehicle 12 could alternatively be configured as the smaller of the two vehicles, and the trailing vehicle 14 could be configured as the larger of the two vehicles.

FIG. 3 schematically illustrates an exemplary design of the charging cord assembly 26 shown in FIGS. 1-2. The charging cord assembly 26 may include a cable 36, a first charge coupler 38, a second charge coupler 40, and a breakaway plug assembly 42. The first charge coupler 38 may be connected to a first end portion 44 of the cable 36, and the second charge coupler 40 may be connected to a second end portion 46 of the cable 36. The first charge coupler 38 may be coupled to the charge port assembly 24 of the leading vehicle 12 or the trailing vehicle 14 and the second charge coupler 40 may be coupled to the charge port assembly 24 of the other of the leading vehicle 12 and the trailing vehicle 14 for transferring power therebetween.

In an embodiment, the first charge coupler 38 and the second charge coupler 40 are configured to plug into an SAE J1772 type charge port assembly. However, other charge coupler configurations are further contemplated within the scope of this disclosure. The specific configuration of the first and second charge couplers 38, 40 is therefore not intended to limit this disclosure.

The breakaway plug assembly 42 may be disposed within the cable 36 at a location between the first charge coupler 38 and the second charge coupler 40. In an embodiment, the breakaway plug assembly 42 is positioned closer to the second charge coupler 40 than to the first charge coupler 38. However, other configurations may also be possible.

The breakaway plug assembly 42 may include a first plug connector 48 and a second plug connector 50 that may be releasably coupled together. In an embodiment, the first plug connector 48 is a male connector and the second plug connector 50 is a female connector. However, an opposite configuration is also possible. The first plug connector 48 and the second plug connector 50 are configured to disconnect or "breakaway" from one another when the leading and trailing vehicles 12, 14 become too far apart during towing events, thereby reducing the likelihood of damaging either the charging cord assembly 26 or the charge port assemblies 24 during in-flight bidirectional energy transfer events.

FIG. 4 illustrates exemplary design details of the cable 36 of the charging cord assembly 26 of FIG. 3. The specific size (e.g., length, outer diameter, etc.) of the cable 36 is design dependent and is therefore not intended to limit this disclosure.

The cable 36 may include an outer jacket 52, a wire bundle 54, and a conductive foamed plastic shielding 56. The conductive foamed plastic shielding 56 may coat the wire bundle 54 to form a cable subassembly 58. The wire bundle 54 may therefore be substantially encapsulated within the conductive foamed plastic shielding 56.

The outer jacket 52 may be circumferentially disposed about the cable subassembly 58 for establishing an outer annular surface of the cable 36. The outer jacket 52 may therefore substantially encapsulate the cable subassembly 58.

In an embodiment, the outer jacket 52 is made of an insulating thermoset material, such as a cross-linked polyethylene, for example. However, the outer jacket 52 could be made of any other suitable plastic or elastomeric material.

The wire bundle 54 may include a plurality of wires that are arranged together to form the wire bundle 54. An exemplary wire bundle 54 is illustrated in FIG. 4, however, other designs are further contemplated within the scope of this disclosure. For example, the wire bundle 54 could include a greater or fewer number of wires than shown in FIG. 4 and still fall within the scope of this disclosure.

The wire bundle 54 may include a first power wire 60, a second power wire 62, a first communications wire 64, a second communications wire 66, and a ground wire 68. The first power wire 60 may be a positive power wire and the second power wire 62 may be a negative power wire. Both the first and second power wires 60, 62 may be cylindrical, insulated conductor wires for conducting power during bidirectional energy transfer events. AC power or DC power may be conducted by the first and second power wires 60, 62. Notably, both AC power and DC power could be conducted by the cable 36 if additional power wires were provided as part of the wire bundle 54.

The first and second communications wires 64, 66 may be cylindrical, insulated communication wires for allowing vehicle-to-vehicle communications during bidirectional energy transfer events (e.g., when the charging cord assembly 26 is plugged into the charge port assemblies 24 of both the leading vehicle 12 and the trailing vehicle 14). The first and second communications wires 64, 66 may include a different wire gauge than the first and second power wires 60, 62.

The ground wire 68 may be a bare cylindrical wire that is in direct contact with the conductive foamed plastic shielding 56. The ground wire 68 may include a different wire gauge than any of the first power wire 60, the second power wire 62, the first communications wire 64, and the second communications wire 66.

The conductive foamed plastic shielding 56 includes a unique design that utilizes conductively modified foam plastic to shield the wire bundle 54, thereby eliminating the use of the relatively expensive woven copper shielding in prior cable designs for reducing EMI. The conductive foamed plastic shielding 56 may include a material make-up that includes a cross-linkable plastic material, a foaming agent, one or more conductive fillers, a compatibilizer, and an antioxidant.

The cross-linkable plastic material of the conductive foamed plastic shielding 56 may be either a cross-linkable thermoset or a cross-linkable thermoplastic that is designed to provide high toughness and ductility to the cable 36. In an embodiment, the cross-linkable plastic material of the conductive foamed plastic shielding 56 is an extrusion grade cross-linkable polyethylene. However, other suitable cross-linkable plastic materials could alternatively be employed as part of the material make-up of the conductive foamed plastic shielding 56 within the scope of this disclosure.

The foaming agent of the conductive foamed plastic shielding 56 may be a chemical foaming agent designed for extrusion applications that require good gas yields and that are characterized by exothermic decomposition. The foaming agent reduces the overall weight of the cable 36 and helps keep the cable 36 cool to the touch.

An exemplary foaming agent is Foamazol™ 89, sold by Bergen International. However, other suitable foaming agents could alternatively be employed as part of the material make-up of the conductive foamed plastic shielding 56 within the scope of this disclosure.

The conductive foamed plastic shielding 56 may include one or more conductive fillers designed to make the cross-linkable plastic material electrically conductive, thereby rendering the cable 36 better suitable for EMI shielding. In an embodiment, a first conductive filler of the material make-up includes graphene, such as GrapheneBlack™ sold by NanoXplore. In another embodiment, the first conductive filler of the material make-up includes an exfoliated graphite.

A second conductive filler of the material make-up of the conductive foamed plastic shielding 56 may include a carbon nanostructure. Using a catalyst (e.g., a silane such as Dynasylan® 4148, sold by Evonik Operations), the carbon nanostructure is designed to grow single wall carbon nanotubes on a substrate such as glass fibers or spheres. The result is a unique morphology of cross-linked and branched carbon nanotubes which branch out with highly conductive pathways that, when combined with the graphene or the exfoliated graphite, create highly conductive electrical pathways within the plastic material. An exemplary carbon nanostructure may include Athlos™ CNS, sold by Cabot. However, other carbon nanostructures may also be employed as part of the material make-up of the conductive foamed plastic shielding 56 within the scope of this disclosure.

The compatibilizer included as part of the conductive foamed plastic shielding 56 may include a polyolefin adhesive or bonding agent for bonding the plastic material to the added conductive fillers. An exemplary compatibilizer is Admer™ QF551E, sold by Misui Chemicals. However, other compatibilizers (e.g., maleic anhydride grafted polypropylene (MAPP), etc.) may alternatively be employed as part of the material make-up of the conductive foamed plastic shielding 56 within the scope of this disclosure.

The antioxidant included as part of the conductive foamed plastic shielding 56 may include a solid antioxidant for improving color stability and reducing oxidation during processing. An exemplary antioxidant is Ultranox® 815, sold by Addivant. However, other antioxidants may also be employed as part of the material make-up of the conductive foamed plastic shielding 56 within the scope of this disclosure.

Table 1, provided below, illustrates an exemplary formulation of the conductive foamed plastic shielding 56 of the cable 36. The formulation is intended to be exemplary only, and thus other formulations for the conductive foamed plastic shielding 56 are contemplated as within the scope of this disclosure. Each substituent component of the example formulation of the conductive foamed plastic shielding 56 is defined in Table 1 as a percentage by weight relative to the total weight of the formulation.

TABLE 1

Exemplary Material Formulation of Conductive Foamed Plastic Shielding

| Material Category | Material | Formulation (% by weight) |
| --- | --- | --- |
| Cross-linkable plastic | Prime LLDPE | 89.75 |
| Conductive filler 1 | GrapheneBlack ™ | 5 |
| Conductive filler 2 | Athlos ™ CNS | 1 |
| Compatibilizer | Admer ™ QF551A | 3 |
| Antioxidant | Ultranox ® 815 | 0.25 |
| Foaming agent | Foamazol ™ 89 | 1 |
| Catalyst | Dynasylan ® 4148 | 1 |

Figure 5:
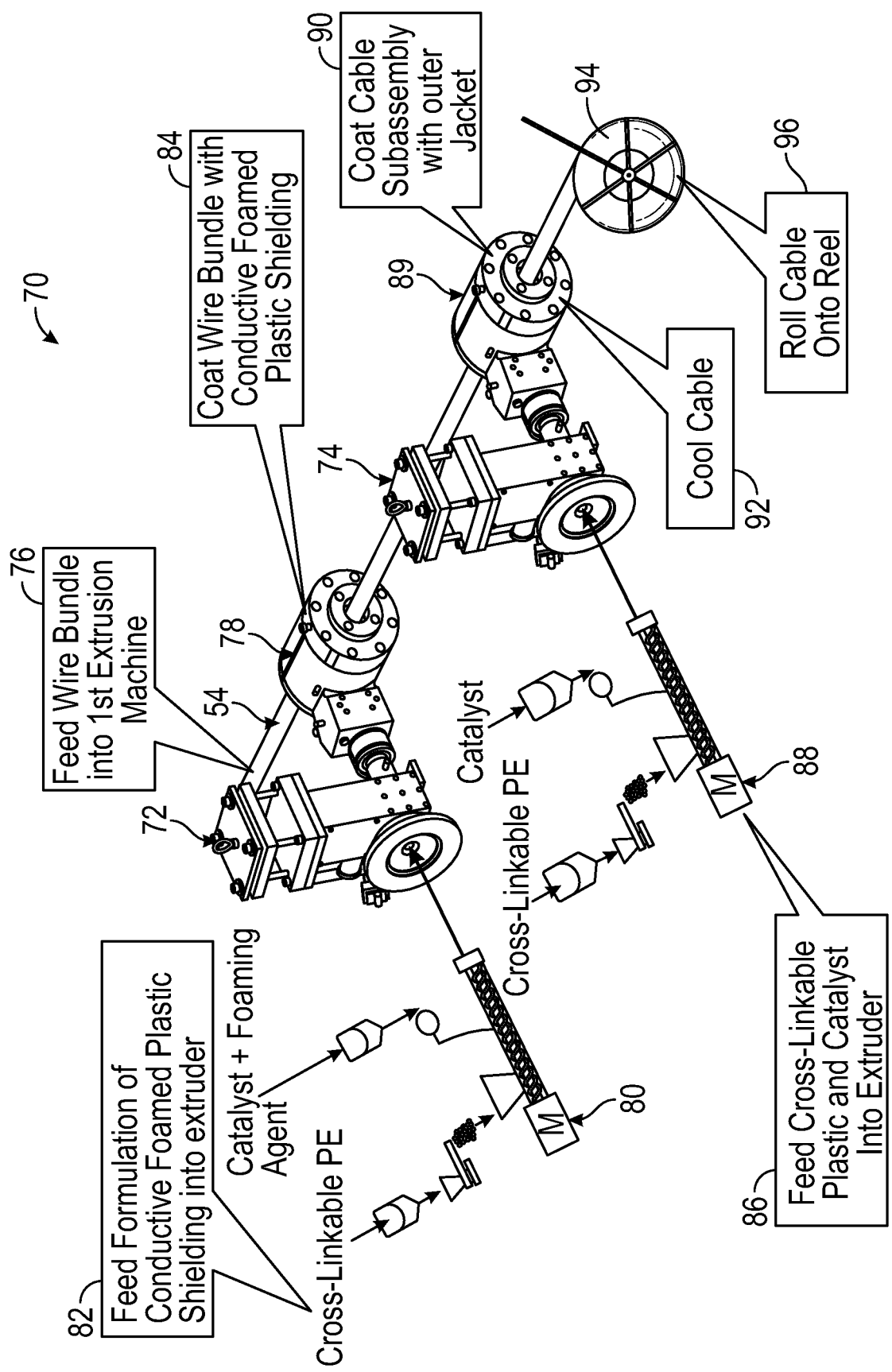
FIG. 5 schematically illustrates a method for manufacturing a cable of a charging cord assembly.

FIG. 5, with continued reference to FIGS. 1-4, schematically illustrates a method 70 of manufacturing the cable 36 of the charging cord assembly 26 described above. The cable 36 may be manufactured in a twin screw extrusion process in which the wire bundle 54 is first coated with the conductive foamed plastic shielding 56 in a first extrusion machine 72 to form the cable subassembly 58, and the cable subassembly 58 is then coated with the outer jacket 52 in a second extrusion machine 74.

The method 70 may be conducted as follows. First, at block 76, the wire bundle 54 may be fed into a first crosshead extrusion die 78 of the first extrusion machine 72. Meanwhile, at block 82, the cross-linkable plastic material, the catalyst, the antioxidant, and the foaming agent may be fed into a first extruder 80 of the first extrusion machine 72. The cross-linkable plastic material may be made using a Sioplas process in which polyethylene is grafted in the presence of a mixture of Vinylsilane and peroxide to make it cross-linkable. The first crosshead extrusion die 78 may then coat the wire bundle 54 with the conductive foamed plastic shielding 56 to form the cable subassembly 58, as schematically shown at block 84.

Next, at block 86, a cross-linkable plastic and a catalyst may be fed into a second extruder 88 of the second extrusion machine 74. A second crosshead extrusion die 89 of the second extrusion machine 74 may then coat the cable subassembly 58 with the outer jacket 52, as schematically shown at block 90. The cable 36 may then be cooled (schematically illustrated at block 92) and then rolled onto a cable reel 94 (schematically illustrated at block 96).

Since the charging cord assembly 26 described above is designed for use during "in-flight" energy transfer events, it may be necessary to route and secure the charging cord assembly 26 between the vehicles 12, 14 to ensure that the cable 36 does not drag along the roadway 18 during the towing event. Several routing configurations for routing the cable 36 of the charging cord assembly 26 are therefore contemplated and are described in detail below.

Figure 6:
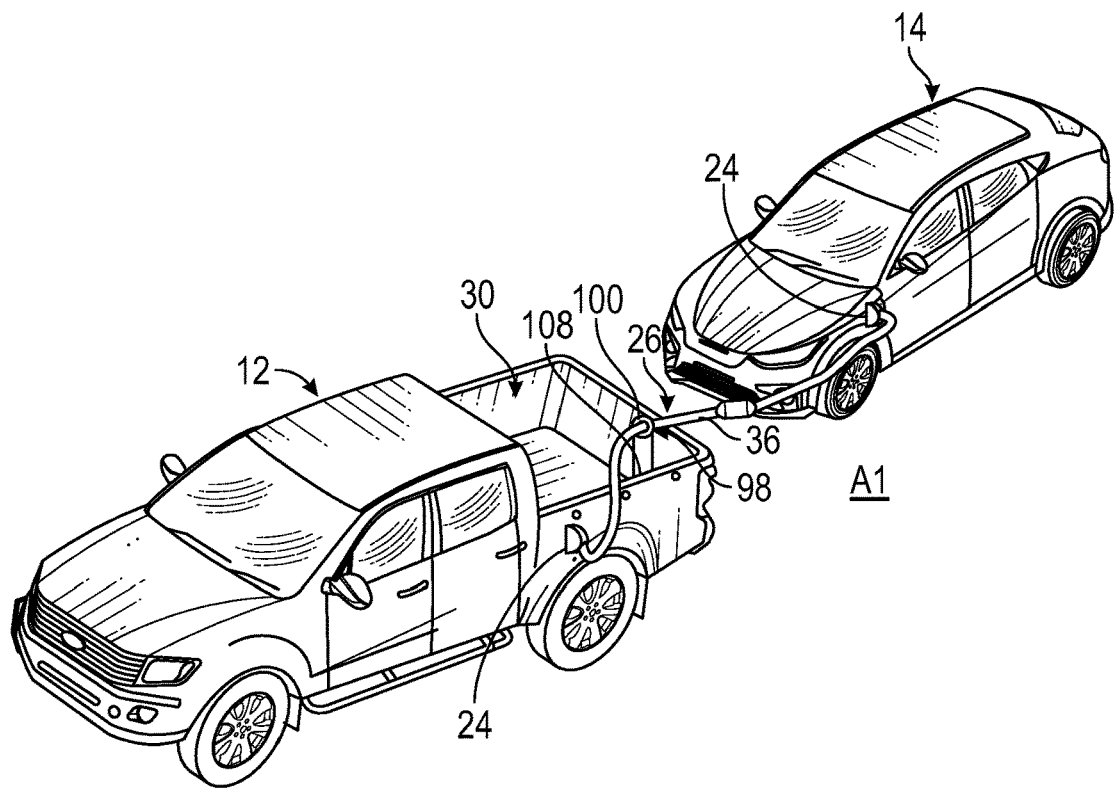
FIG. 6 illustrates an exemplary arrangement for routing a cable of a charging cord assembly during in-flight bidirectional energy transfer events.

FIG. 6 illustrates a first exemplary routing arrangement A1 for routing the cable 36 of the charging cord assembly 26 during in-flight bidirectional energy transfer events. The routing arrangement A1 may be particularly suitable for situations in which the charge port assembly 24 of the leading vehicle 12 is located within the rear half (e.g., rearward of the passenger cabin) of the leading vehicle 12.

An adjustable retaining ring 98 may be utilized for achieving the routing arrangement A1. In an embodiment, the adjustable retaining ring 98 is mounted within or near the cargo space 30 (e.g., the truck bed) of the leading vehicle 12. The cable 36 of the charging cord assembly 26 may be routed through a clasp ring 100 of the adjustable retaining ring 98 for positioning and securing the cable 36 relative to the leading vehicle 12.

Figure 7:
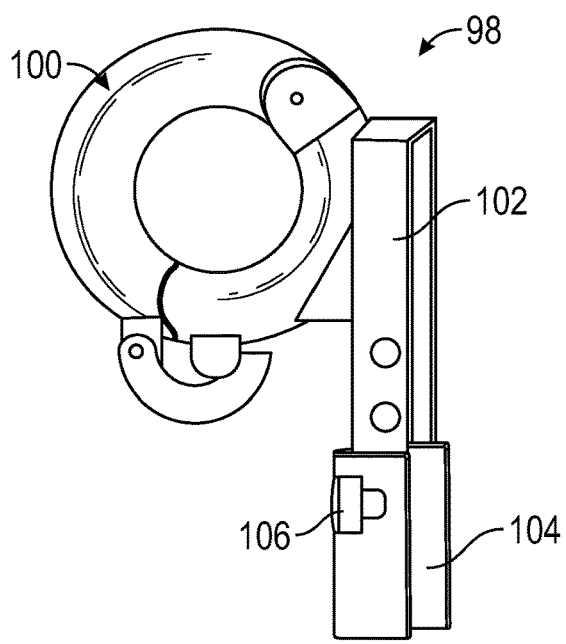
FIG. 7 illustrates an adjustable retaining ring for achieving the cable routing arrangement of FIG. 6.

Referring now primarily to FIG. 7, the adjustable retaining ring 98 may include the clasp ring 100, a sleeve 102, a lower strake 104, and an adjustment pin 106. The lower strake 104 may be secured to a sidewall 108 (see FIG. 6) of the cargo space 30 in any conventional manner. The sleeve 102 may slide relative to the lower strake 104 and may be vertically adjusted to a desired height. Once the desired height is selected, the positioning of the sleeve 102 may be fixed relative to the lower strake 104 via the adjustment pin 106.

The lower strake 104 may be made of a metallic material (e.g., powder coated steel), and the clasp ring 100 and the sleeve 102 may be made of a thermoplastic material (e.g., nylon). However, other materials or combinations of materials may be utilized as part of the adjustable retaining ring 98 within the scope of this disclosure.

Figure 8:
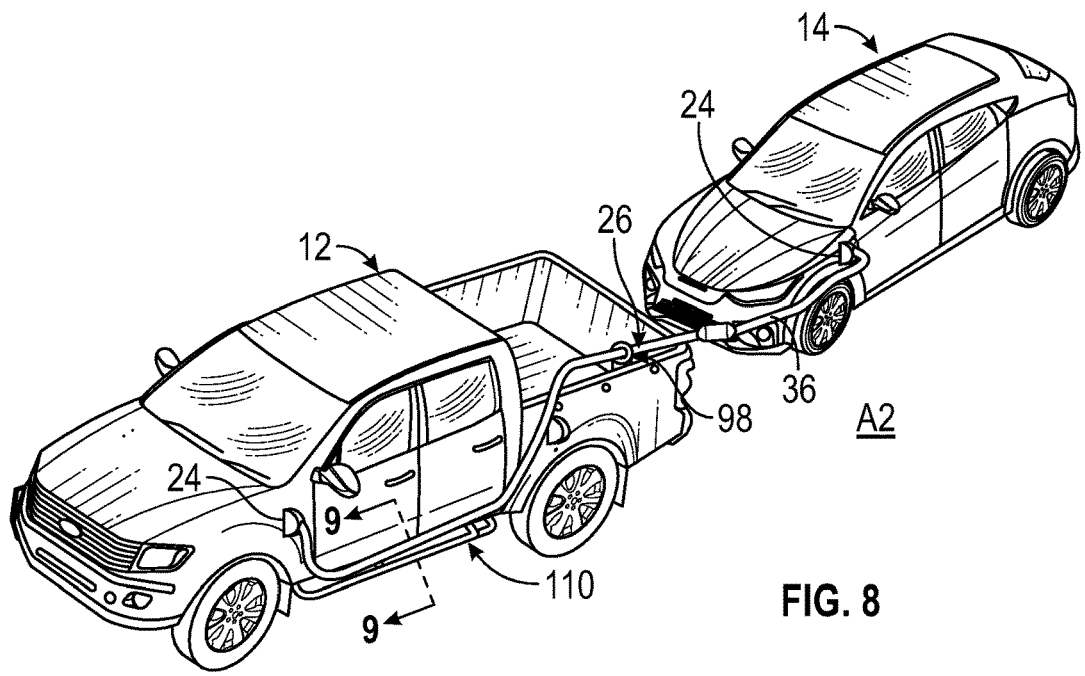
FIG. 8 illustrates another exemplary arrangement for routing a cable of a charging cord assembly during in-flight bidirectional energy transfer events.
Figure 9:
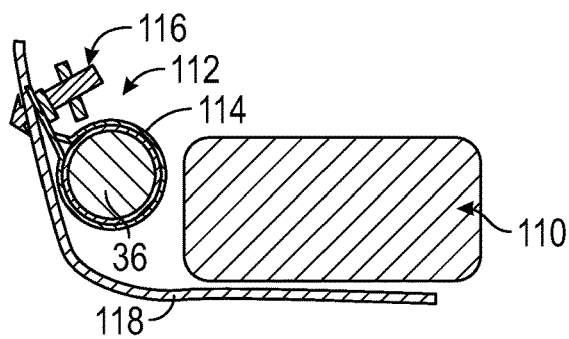
FIG. 9 is a cross-sectional view through section 9-9 of FIG. 8 and illustrates an attachment strap assembly for achieving the cable routing arrangement of FIG. 8.

FIGS. 8-9 illustrate another exemplary routing arrangement A2 for routing the cable 36 of the charging cord assembly 26 during in-flight bidirectional energy transfer events. The routing arrangement A2 may be particularly suitable for situations in which the charge port assembly 24 of the leading vehicle 12 is located within the front half (e.g., to the front of the passenger cabin) of the leading vehicle 12. In these situations, the cable 36 of the charging cord assembly 26 may be routed along a running board 110 (shown in its deployed position) of the leading vehicle 12. Routing the cable 36 in this manner ensures that a user is able to open the driver-side doors of the leading vehicle 12 even when the charging cord assembly 26 is connected to both the leading vehicle 12 and the trailing vehicle 14.

One or more attachment strap assemblies 112 may be utilized for achieving the routing arrangement A2. In an embodiment, each attachment strap assembly 112 includes an attachment strap 114 and a fastener assembly 116 adapted for securing the attachment strap 114 to a bracket 118 of the running board 110. The cable 36 of the charging cord assembly 26 may be routed through an opening provided by the attachment strap 114 for positioning and securing the cable 36 near the running board 110 of the leading vehicle 12. As further illustrated in FIG. 8, the attachment strap assembly 112 may optionally be used in combination with the adjustable retaining ring 98 for achieving the routing arrangement A2.

The fastener assembly 116 of the attachment strap assembly 112 is further detailed with reference to FIGS. 10A and 10B. The fastener assembly 116 may include a fastener base 120 and a fastener plunger 122 that is movably coupled to the fastener base 120. The fastener assembly 116 is shown in a locked position in FIG. 10A and is shown in an unlocked position in FIG. 10B.

Figure 10A:
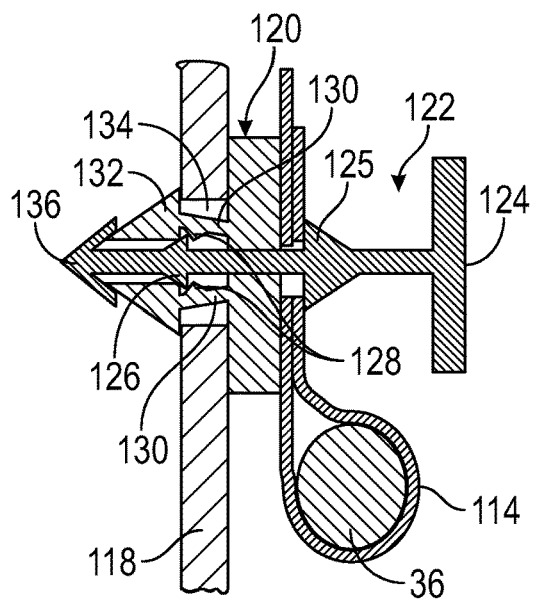
FIGS. 10A and 10B illustrate a fastener assembly of the attachment strap assembly of FIG. 9.

In the locked position of FIG. 10A, a T-head 124 of the fastener plunger 122 is pushed toward the bracket 118 until a stop 125 is forced into abutting contact with the attachment strap 114, thereby moving an arrowhead-shaped feature 126 of the fastener plunger 122 into engagement with detents 128 formed on base legs 130 of the fastener base 120. This engagement thereby moves an arrowhead-shaped feature 132 of the fastener base 120 radially outward for engaging a surface of the bracket 118 that circumscribes an opening 134 through which the fastener assembly 116 is inserted. A pointed tip 136 of the fastener plunger 122 guides insertion of the fastener assembly 116 through the opening 134.

Figure 10B:
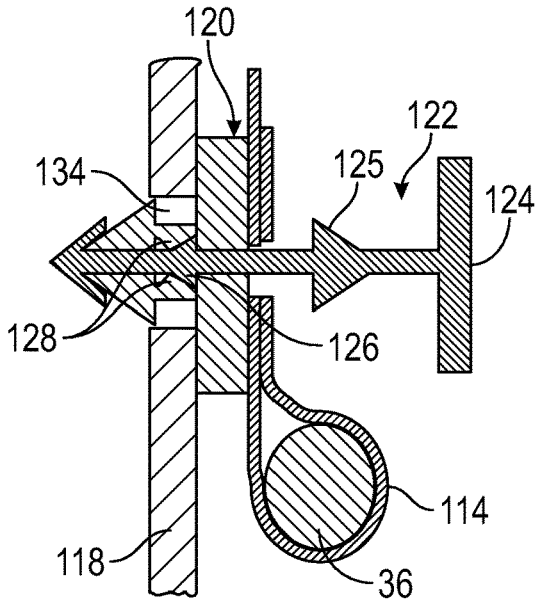

In the unlocked position in FIG. 10B, the T-head 124 is pulled in a direction away from the bracket 118 to move the stop 125 away from the attachment strap 114, thereby allowing the arrowhead-shaped feature 126 to slip past the detents 128 of the fastener base 120. Once in this position, the fastener assembly 116, and thus the entire attachment strap assembly 112, can be removed from the bracket 118 of the running board 110.

The fastener base 120 and the fastener plunger 122 may be made of a thermoplastic material (e.g., nylon). However, other materials or combinations of materials could be utilized to construct the two-piece fastener assembly 116 within the scope of this disclosure.

Figure 11:
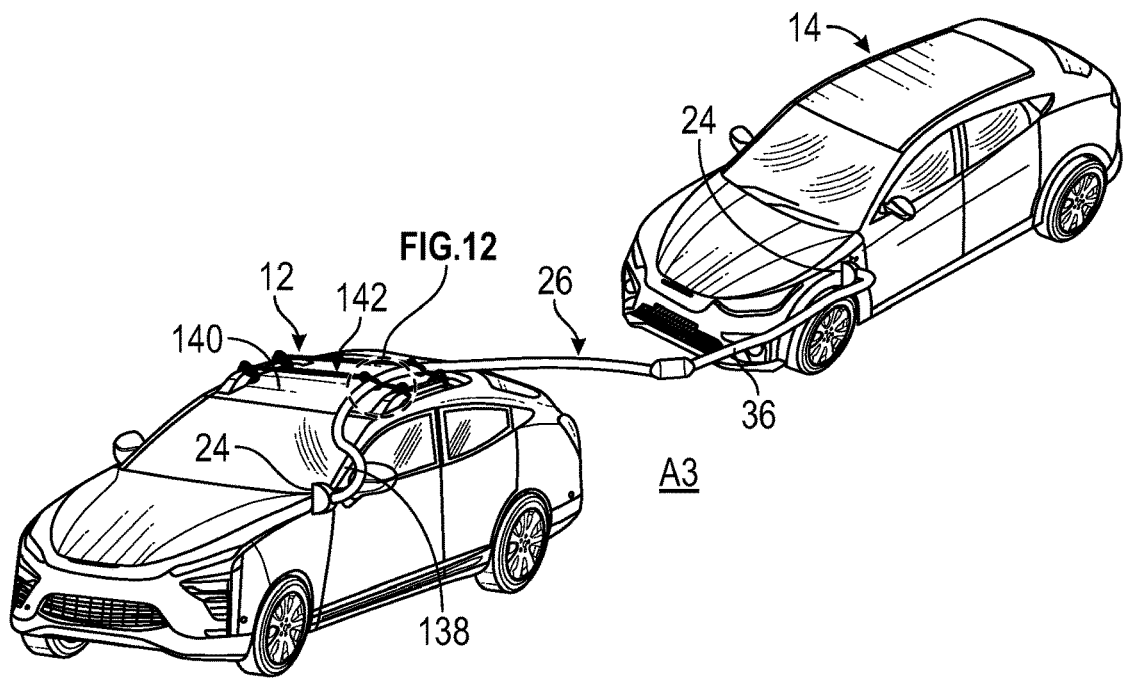
FIG. 11 illustrates yet another exemplary arrangement for routing a cable of a charging cord assembly during in-flight bidirectional energy transfer events.
Figure 12:
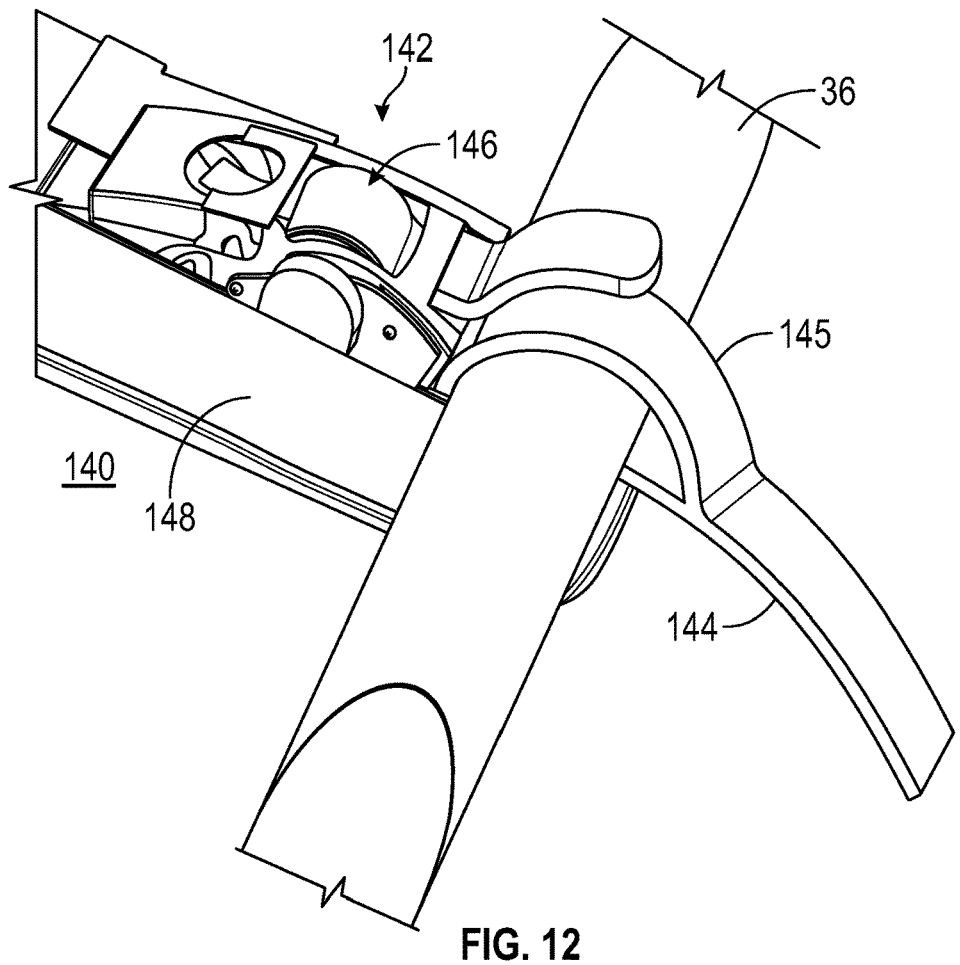
FIG. 12 illustrates an attachment strap assembly for achieving the cable routing arrangement of FIG. 11.

FIGS. 11 and 12 illustrate yet another exemplary routing arrangement A3 for routing the cable 36 of the charging cord assembly 26 during in-flight bidirectional energy transfer events. The routing arrangement A3 may be particularly suitable for situations in which the charge port assembly 24 of the leading vehicle 12 is located within the front half (e.g., to the front of the passenger cabin) of the leading vehicle 12 and the vehicle is not equipped with running boards. In such situations, the cable 36 of the charging cord assembly 26 may be routed along an A-pillar 138 and a top surface 140 of the leading vehicle 12. Routing the cable 36 in this manner ensures that a user is able to open the driver-side doors of the leading vehicle 12 even when the charging cord assembly 26 is connected to the leading and trailing vehicles 12, 14.

One or more attachment strap assemblies 142 may be utilized for achieving the routing arrangement A3. In an embodiment, each attachment strap assembly 142 includes an attachment strap 144, an attachment ratchet 146, and a mounting pad 148. The attachment strap 144 may be wrapped around and through a vehicle door opening and then clasped inside the vehicle in a conventional manner, such as via quick-connect snap connections. The cable 36 of the charging cord assembly 26 may be routed through a loop 145 of the attachment strap 144 for positioning and securing the cable 36 along the top surface 140 of the leading vehicle 12.

Referring now primarily to FIG. 12, the mounting pad 148 may be positioned in direct contact with the top surface 140 and is configured to protect the top surface 140 from being scratched by the attachment ratchet 146. The mounting pad 148 may be sewn into the attachment strap 144. The attachment ratchet 146 is connected to the attachment strap 144 and may be used to tighten and secure the attachment strap assembly 142 in place over the top surface 140 and through the vehicle door openings.

The vehicle-to-vehicle (V2V) in-flight energy transfer systems of this disclosure may utilize a charging cord assembly having a unique conductive foamed plastic shielding for substantially reducing or even preventing electromagnetic interference (EMI) as current is passed through the cable. The systems may further utilize one or more routing arrangements for positioning and routing the cable between the vehicles, thereby reducing or even preventing the likelihood of the cable being damaged during the in-flight bidirectional energy transfer events.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charging cord assembly, comprising:
a cable including a wire bundle coated with a conductive foamed plastic shielding,
wherein a material make-up of the conductive foamed plastic shielding comprises a cross-linkable plastic material, a conductive filler, and a foaming agent.

2. The charging cord assembly as recited in claim 1, comprising a first charge coupler connected to a first end portion of the cable and a second charge coupler connected to a second end portion of the cable.

3. The charging cord assembly as recited in claim 2, comprising a breakaway plug assembly disposed within the cable at a location between the first charge coupler and the second charge coupler.

4. The charging cord assembly as recited in claim 1, wherein the wire bundle and the conductive foamed plastic shielding establish a cable subassembly of the cable, and further wherein the cable subassembly is coated with an outer jacket.

5. The charging cord assembly as recited in claim 1, wherein the wire bundle includes at least a first power wire, a second power wire, a first communications wire, a second communications wire, and a ground wire.

6. The charging cord assembly as recited in claim 1, wherein the cross-linkable plastic material is a cross-linkable polyethylene, the conductive filler includes a graphene or an exfoliated graphite, and the foaming agent is a chemical foaming agent.

7. The charging cord assembly as recited in claim 6, wherein the conductive filler includes a carbon nanostructure.

8. The charging cord assembly as recited in claim 1, wherein the conductive foamed plastic shielding further comprises a compatibilizer, and an antioxidant.

9. The charging cord assembly as recited in claim 8, wherein the cross-linkable plastic material is a cross-linkable polyethylene, the foaming agent is Foamazol™ 89, the conductive filler includes GrapheneBlack™ and Athlos™ CNS, the compatibilizer is Admer™ QF551E, and the antioxidant is Ultranox® 815.

10. The charging cord assembly as recited in claim 1, comprising an adjustable retaining ring configured for routing the cable relative to a structure.

11. The charging cord assembly as recited in claim 10, wherein the cable is received through a clasp ring of the adjustable retaining ring.

12. The charging cord assembly as recited in claim 11, wherein the adjustable retaining ring includes the clasp ring, a sleeve, a lower strake, and an adjustment pin.

13. The charging cord assembly as recited in claim 1, comprising an attachment strap assembly configured for routing the cable relative to a structure.

14. The charging cord assembly as recited in claim 13, wherein the attachment strap assembly includes an attachment strap and a fastener assembly.

15. The charging cord assembly as recited in claim 14, wherein the fastener assembly includes a fastener base and a fastener plunger movably coupled to the fastener base.

16. The charging cord assembly as recited in claim 13, wherein the attachment strap assembly includes an attachment strap, an attachment ratchet, and a mounting pad.

17. A charging cord assembly, comprising:
a cable including a wire bundle coated with a conductive foamed plastic shielding,
wherein the wire bundle includes a bare ground wire that is in direct contact with the conductive foamed plastic shielding.

18. A charging cord assembly, comprising:
a wire bundle including a plurality of wires;
a conductive foamed plastic shielding that encapsulates the wire bundle to form a cable subassembly; and
an outer jacket that encapsulates the cable subassembly.

19. The charging cord assembly as recited in claim 18, wherein the conductive foamed plastic shielding includes a cross-linkable plastic material, a conductive filler, and a foaming agent.

* * * * *